United States Patent [19]

Ip

[11] Patent Number: 5,622,401
[45] Date of Patent: Apr. 22, 1997

[54] CLIPPED-ON CENTER VISOR FOR CARS

[76] Inventor: Angela Y. C. Ip, 95-345 Lanikuhana Ave., Mililani, Hi. 96789

[21] Appl. No.: 573,574

[22] Filed: Dec. 15, 1995

Related U.S. Application Data

[63] Continuation-in-part of Ser. No. 374,845, Jan. 18, 1995, abandoned.

[51] Int. Cl.⁶ .................................................. B60J 3/02
[52] U.S. Cl. .................. 296/97.6; 296/97.8; 296/97.11
[58] Field of Search ............................ 296/97.6, 97.8, 296/97.9, 97.11, 97.1

[56] References Cited

U.S. PATENT DOCUMENTS

| | | | |
|---|---|---|---|
| 2,235,421 | 3/1941 | Devine | 296/97.11 |
| 2,603,530 | 7/1952 | Jones | 296/97.6 |
| 3,122,393 | 2/1964 | Moody | 296/97.11 |
| 3,534,999 | 10/1970 | Kesselring | 296/97.6 |
| 4,248,473 | 2/1981 | Hildebrand | 296/97.6 X |
| 4,982,992 | 1/1991 | Vu et al. | 296/97.6 |

FOREIGN PATENT DOCUMENTS

| | | | |
|---|---|---|---|
| 2504470 | 10/1982 | France | 296/97.1 |
| 609289 | 9/1960 | Italy | 296/97.8 |
| 8602322 | 4/1986 | WIPO | 296/97.6 |

*Primary Examiner*—David M. Mitchell
*Assistant Examiner*—Kia M. Robinson

[57] ABSTRACT

A sheet of opaque material, fixed to a support arm which is extendable from a housing unit clipped onto a conventional visor of a car, to provide a car driver with protection from glare coming around the rear mirror area.

4 Claims, 4 Drawing Sheets

CLIPPED-ON CENTER VISOR FOR CARS

This is a continuation-in-part of application No. 08/374,845, filed Jan. 18, 1995, now abandoned.

BACKGROUND

The present invention relates to accessories installed inside a car, and more particularly to accessories which provide protection from glare.

There is a general need to provide protection to car drivers from glare. In almost every car, a visor is installed on the driver-side to protect him/her from glare coming directly in front or from the left-hand side. Similarly, there is another visor on the front passenger side. However, the area around the rear mirror is not protected.

It is important that the driver should be fully aware of the surrounding traffic conditions at all times when driving, including the traffic at the rear. To avoid the glare around the rear mirror, a driver tends not to look at the rear mirror as often as he/she should. Not being fully aware of the traffic conditions, the driver could be more apt to accidents, with the safety of himself/herself and other road users being compromised.

However, no device is known to provide protection to the driver from glare around the rear mirror area.

It is understood that a patent application entitled "Extension Center Visor for Cars" was submitted on Jan. 10, 1995 by Angela Yuen Ching Ip, who is also the applicant of the present invention. But, that device, designed primarily for new cars, is not meant to be installed after the production of the car has been completed.

The great advantage of the present invention is that it is a device which can be simply clipped onto a conventional visor of any existing car at any time.

The present invention is to supplement the conventional visors to provide effective protection from glare at the area around the rear mirror.

The present invention is essential for safe driving.

SUMMARY

The principal object of the present invention is to provide the driver of a car with protection from glare coming from the area adjacent to and surrounding the rear mirror.

It is also an object of the present invention to provide such protection by means of a device which is simple and convenient for the driver to use and can be added on to any models of existing cars at any time.

The present invention is a device that can simply be clipped onto the conventional visor on the driver-side. The sheet of opaque material of this device can be readily placed at such a position and angle desired by the driver to protect himself/herself from glare coming around the rear mirror area.

DESCRIPTION OF THE PREFERRED EMBODIMENT

The present invention has three integral parts: a sheet of opaque material fixed to a support arm, a housing unit which keeps the opaque sheet in position and in which the support arm is placed, and, a pair of clips to attach the housing unit onto a conventional visor of a car.

The support arm, housing unit and clips are lightweight material such as aluminum alloy.

The present invention can be conveniently used by a driver: when the conventional visor is pulled down, the sheet of opaque material can be pulled out from its housing unit and placed at a desired position, behind the rear mirror, to provide effective protection from glare around the rear mirror area.

The housing unit with the opaque sheet and its support arm can be attached to the clips along the opening slits and the entire device clipped onto the conventional visor on the driver-side.

The present invention can be an item added to any car at any time. Its clipped-on position can be readily adjusted both vertically and horizontally to fit almost any existing models.

The present invention fulfills a safe-driving need which has hitherto not been taken care of by any known devices. No device is known to be capable of being placed behind the rear mirror to provide protection from glare around that area.

FIG. 1

Figure 1:
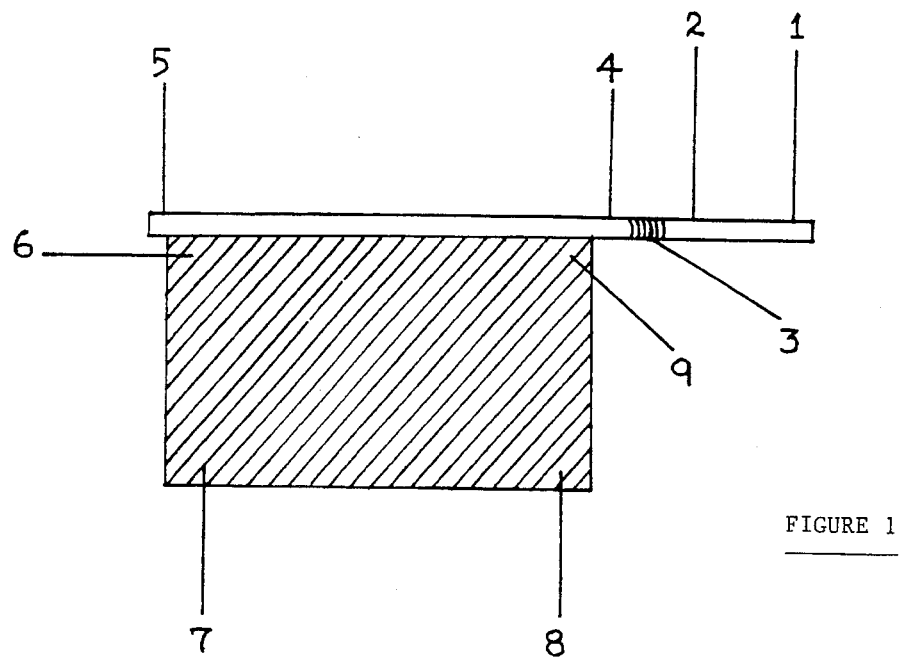
FIG. 1 shows a sheet of opaque material fixed to a tubular support arm, the middle section of which is a flexible spiral coil.

FIG. 1 is the first of the three integral parts of the present invention: a sheet of opaque material fixed to a tubular arm.

This arm consists of three sections: (a) a first section (arm 1,2) being the anchor which holds the other two sections in position when the opaque sheet is pulled out from a housing unit; (b) a middle section (arm 3) being a spiral coil which can be flexed to stay at a desired angle relative to the first section by appropriate external force; and (c) a third section (arm 4,5) to which a sheet (sheet 6,7,8,9) of opaque material is fixed.

These three sections form a continuous arm: the middle section of spiral coil (arm 3) is inbetween the first section (arm 1, 2) and the third section (arm 4, 5) somehow connected between them (e.g. by means of soldering).

The opaque sheet fixed to the third section protects the driver from glare around the rear mirror area when it is pulled out to the center of the car and placed behind the mirror.

The middle section of spiral coil is an important feature of this invention—the flexibility of the coil allows the opaque sheet to be tilted at various positions as needed by the driver.

FIG. 2

Figure 2:
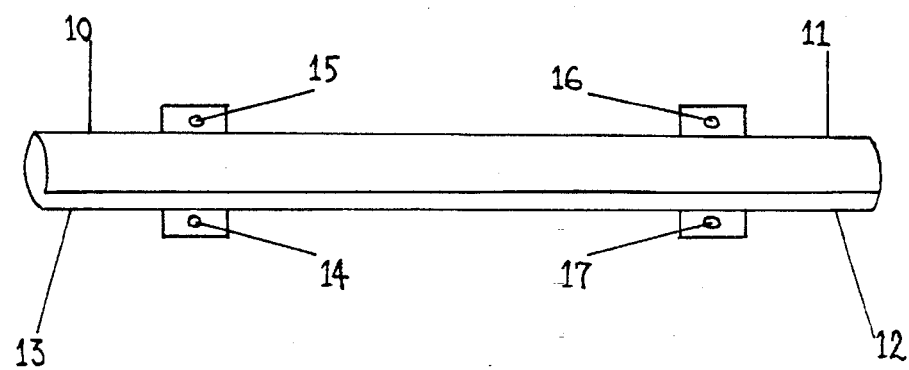
FIG. 2 shows a cylindrical housing unit for the support arm and the opaque sheet. This housing unit has an opening at the bottom and shall be attached to two clips by nuts and bolts.

FIG. 2 is the second integral part of the present invention: a housing unit in which the support arm is placed, and, by which the opaque sheet attached to the third section of the arm is prevented from accidentally falling down and blocking the driver's view.

The housing unit (unit 10,11) is a cylindrical tubing with an opening (opening 12,13) at the bottom. This opening has two very important functions: (a) the edges of this opening hold the opaque sheet which is attached to the third section of the arm in its proper position when it is not in use, and (b) it provides a passage for the opaque sheet to move freely when being pulled out or retracted for storage. (Refer also to FIG. 6.)

The diameter of the housing unit is marginally bigger than that of the support arm such that the arm will be held in a stationary position by the friction created between the outside surface of the arm and the inner surface of the housing unit unless and until it is pulled or pushed by appropriate external force.

The housing unit shall be attached to a pair of clips by means of nuts and bolts through the holes in the brackets (holes 14, 15, 16 and 17).

FIG. 3

Figure 3:
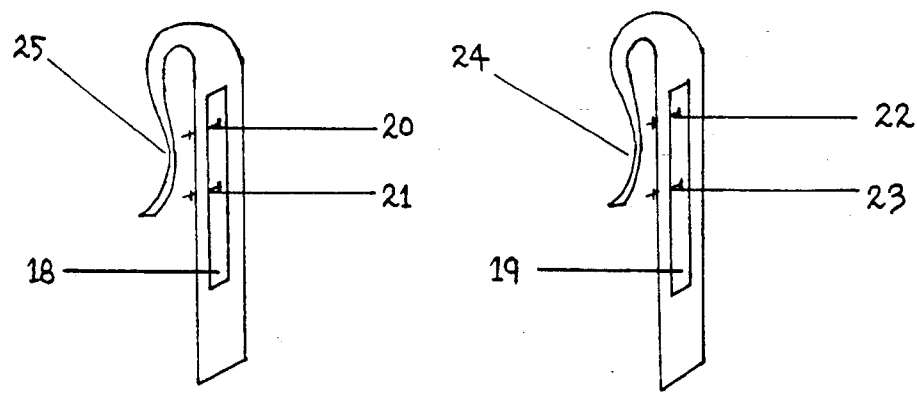
FIG. 3 shows two clips each of which has an opening slit such that the housing unit can be attached along the slit at positions as desired.

FIG. 3 is the third integral part of the present invention: a pair of clips.

This pair of clips provides the link between the housing unit and the conventional visor. They can be placed at any horizontal position along the conventional visor as decided by the user. Furthermore, different car models may require the housing unit to be clipped at different heights. The opening slits (slits 18 and 19) in the front panels provide the facility to meet such requirement. Positions 20, 21, 22 and 23 are examples only. Positions 24 and 25 and the front panels shall hold the clips firmly onto the conventional visor.

FIG. 4

Figure 4:
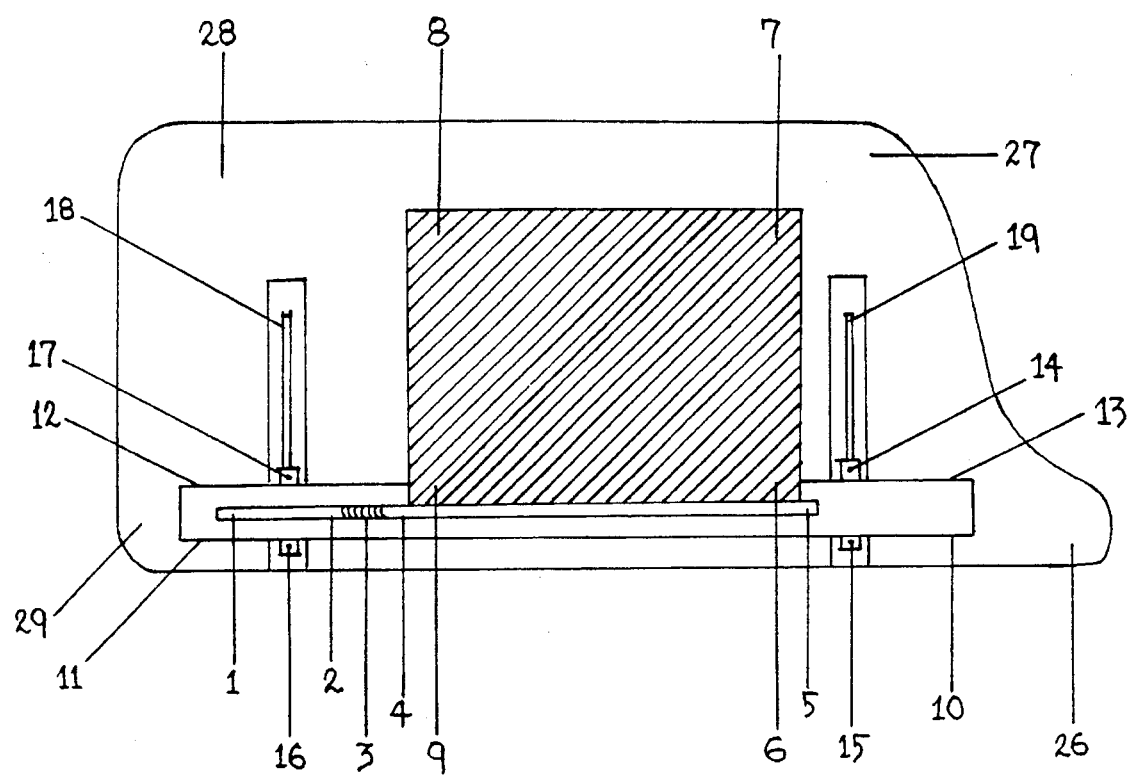
FIG. 4 shows the device clipped onto a conventional visor on the driver-side, in the "storage" position.

FIGS. 4 shows the device clipped onto the conventional visor (visor 26,27,28,29) on the driver-side, at its "storage" position.

FIG. 5

Figure 5:
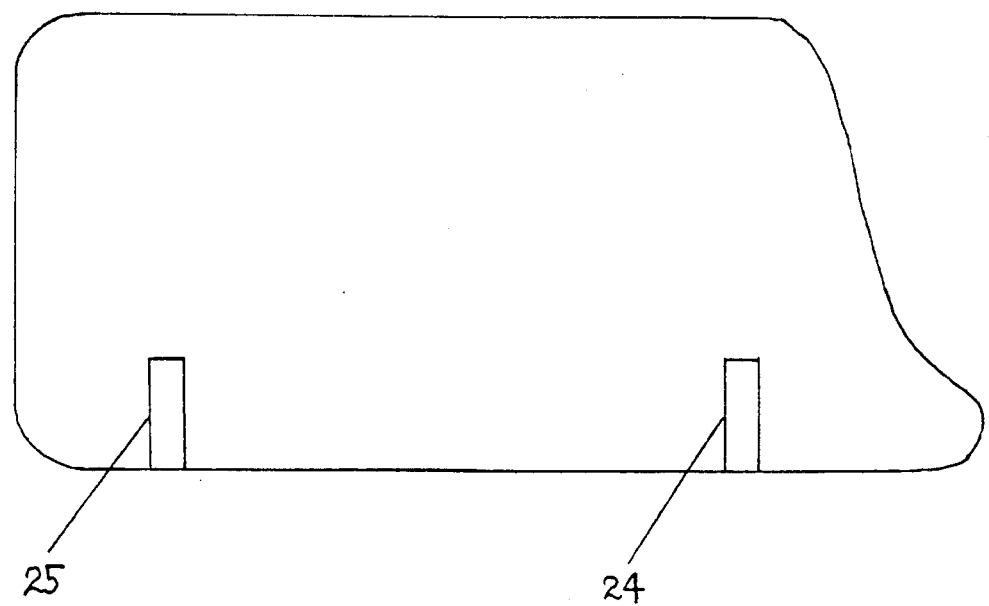
FIG. 5 shows the device clipped onto a conventional visor on the driver-side, in the "storage" position. This is the view of the back-side of FIG. 4.

FIG. 5 is the view of the back side of FIG. 4 showing the ends of the two clips.

FIG. 6

Figure 6:
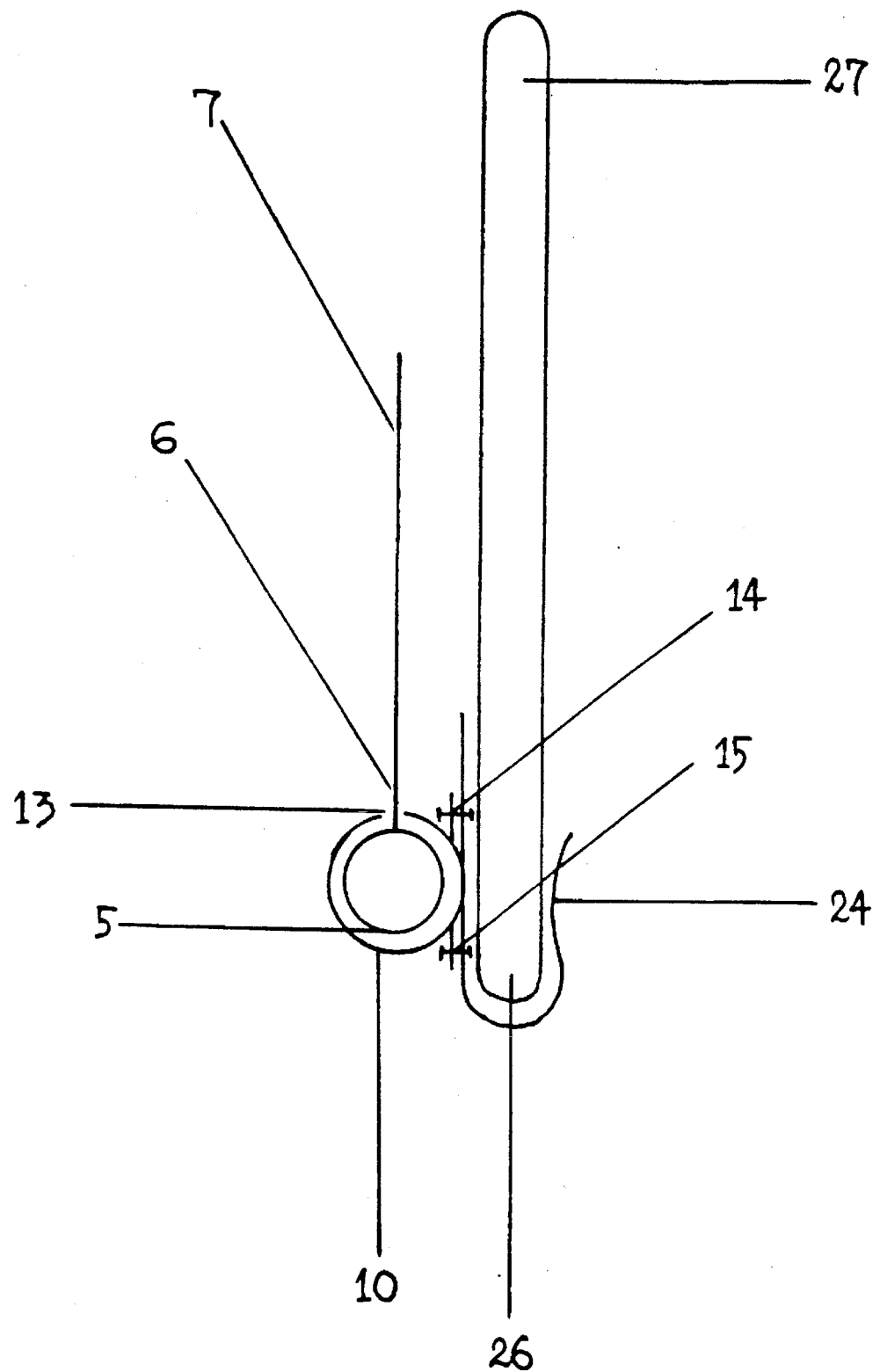
FIG. 6 is the end cross-section of the device clipped onto a conventional visor.

FIG. 6 is the end cross-section showing the position of the device in relation to the conventional visor—the device is at its storage position.

The edge of the opening of the housing unit keeps the opaque sheet from falling thus preventing any accidental blocking of the driver's view. The support arm of the opaque sheet is inside the housing unit, which is attached to the panel of the clip by means of nuts and bolts.

FIG. 7

Figure 7:
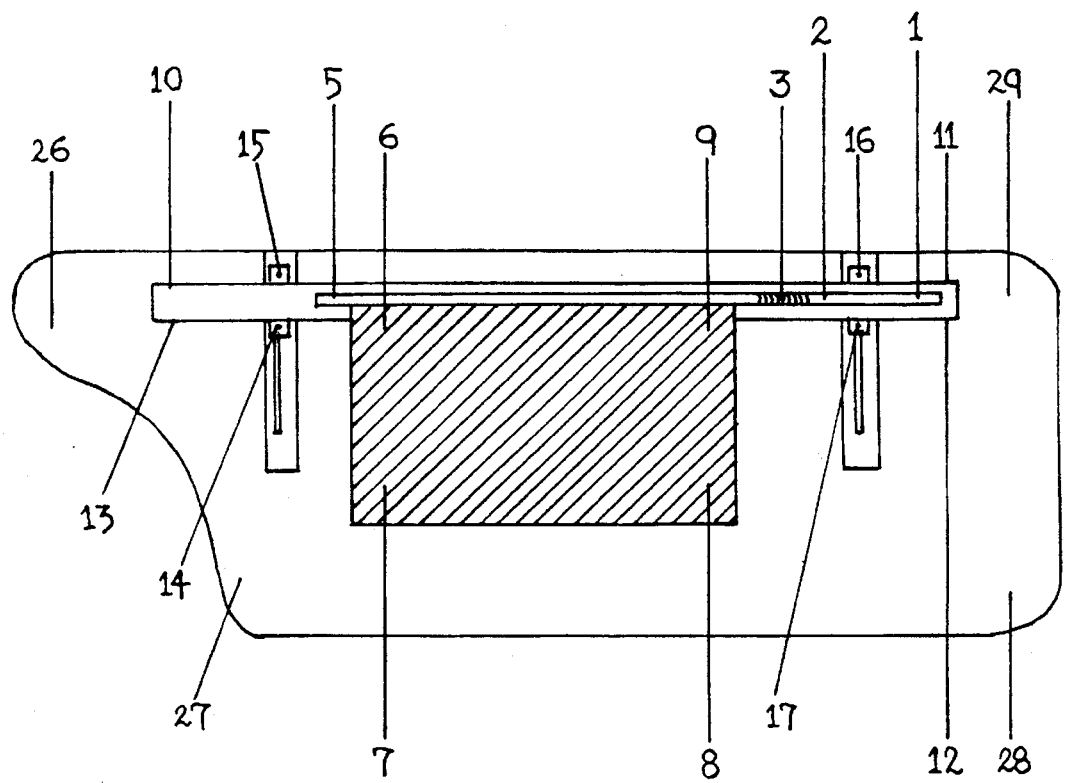
FIG. 7 shows the view from the outside of the car when a conventional visor clipped with the present invention is pulled down.

FIG. 7 shows the view, from the outside of the car, when the conventional visor is pulled down and the Clipped-On Center Visor ready for use.

FIG. 8

Figure 8:
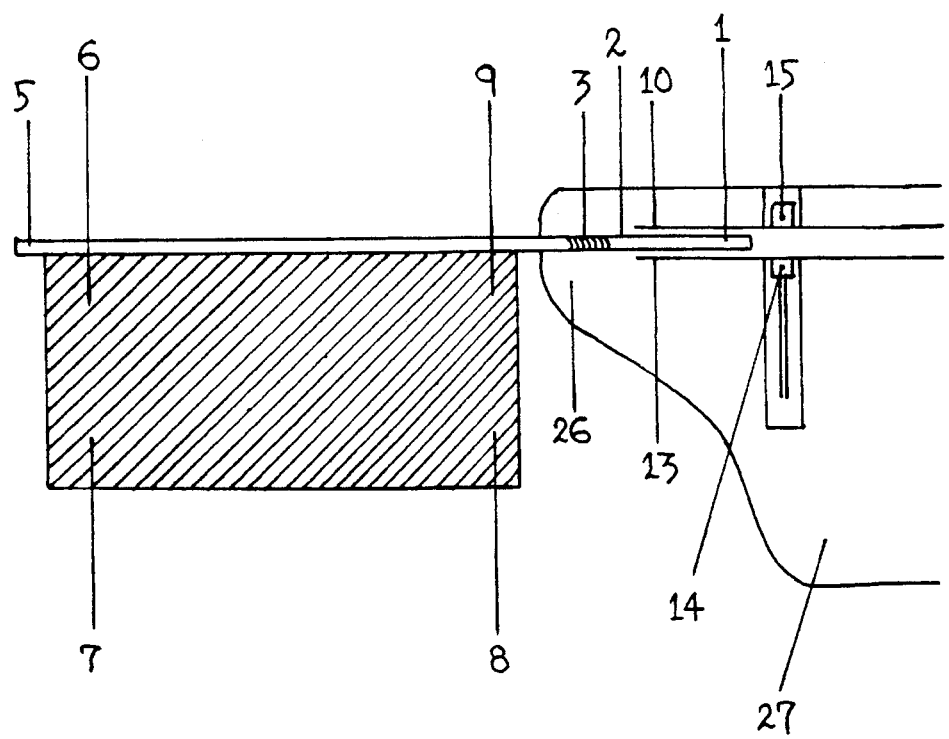
FIG. 8 shows the view from the outside of the car when the sheet of opaque material of the present invention is extended.

FIG. 8 is a view from the outside of the car. It shows the opaque sheet pulled out from the housing unit placed behind the rear mirror. The first section (arm 1,2) of the support arm remaining inside the housing unit serves as the anchor.

In certain cars, rear mirrors are linked by mounts to the front wind shield. Such mounts will prevent the opaque sheets of the center visors to be fully placed behind the rear mirrors. In such a case, protection from glare can be provided by installing two Clipped-On Center Visors, one on the driver-side and one on the passenger-side, both extended towards the center.

It will be apparent that modification in accordance with the present invention can be made by those skilled in the art without departing from the spirit thereof. For example, translucent materials (such as materials for sunglasses) can be used instead of opaque materials.

It will be obvious to those skilled in the art that various changes may be made without departing from the scope of the invention and the invention is not to be considered limited to what is shown in the drawings and described in the foregoing description.

The invention is a device providing drivers with protection from glare around the rear mirror. It is simple to operate, suitable for almost all models of cars. Most importantly, it fulfills a safe-driving need which has hitherto not been taken care of by any known devices.

What is claimed is:

1. A device to provide car drivers with protection from glare around a rear mirror area comprising:
   a sheet of opaque material;
   a tubular support arm of three sections, said three sections further characterized by:
   (a) a first section being an anchor when the arm is extended,
   (b) a second section of flexible spiral coil,
   (c) a third section to which said sheet of opaque material is fixedly connected and entirely supposed, and wherein said second section is connected in between and has a smaller length than said first and third sections;
   a cylindrical housing unit with an opening at a bottom, in which said support arm is placed; and
   a means by which said housing unit is clipped onto a visor of a car.

2. The device in claim 1, further characterized by said housing unit having a diameter marginally bigger than that of said support arm such that when said arm is extended, it will be held stationary by friction created between an outer surface of said support arm and an inner surface of said cylindrical housing unit, unless and until an external force greater than the friction created is applied to move said arm.

3. The device in claim 1, further characterized by said housing unit having said opening at said bottom such that an edge of said opening keeps said support arm from falling through the opening away from said visor while allowing said sheet of opaque material to move freely along said opening.

4. The device in claim 1, further characterized by said means by which said housing unit is clipped being a pair of clips having nuts and bolts along opening slits of front panels of said clips, such that said opening slits allow said housing unit to be placed at various vertical positions.

* * * * *

UNITED STATES PATENT AND TRADEMARK OFFICE
CERTIFICATE OF CORRECTION

PATENT NO. : 5,622,401
DATED      : April 22, 1997
INVENTOR(S): Angela Y. C. IP

It is certified that error appears in the above-indentified patent and that said Letters Patent is hereby corrected as shown below:

Claim 1, under (c), line 10, "supposed" should read--"supported".--

Signed and Sealed this

Twenty-ninth Day of July, 1997

Attest:

BRUCE LEHMAN

*Attesting Officer*     *Commissioner of Patents and Trademarks*